3,337,862
ELECTRICAL SIGNALLING SYSTEMS

Geoffrey Francis Croft and John Christopher Hammond Davis, Taplow, England, assignors to British Telecommunications Research Limited, Taplow, England, a British company Filed Nov. 12, 1963, Ser. No. 322,988
Claims priority, application Great Britain, Nov. 15, 1962, 43,291/62
4 Claims. (Cl. 340—347)

Figure 1:
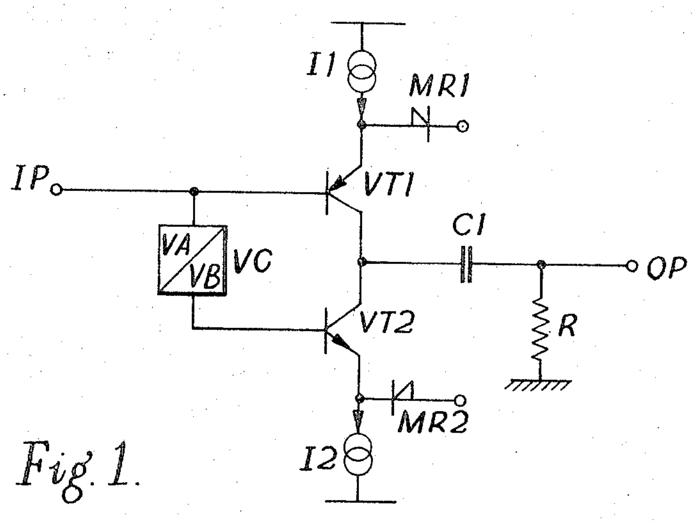

The present invention relates to electrical signalling systems and is more particularly concerned with systems in which binary information is transmitted on a basis which nominally involves two direct current levels. Systems operating on this general basis may be used for instance in pulse code modulation signalling and they are finding increasing application for data transmission purposes.

At the receiving end of a pulse code modulation link, for example, it is usual to employ some form of limiting or slicing arrangement since the amplitude of the received signals cannot readily be maintained constant. There is danger, however, that D.C. drift will develop as a result of variation in pulse trains and this might result in genuine signals falling below the slicing level and thus becoming lost or have the effect that spurious noise signals exceed the slicing level and are considered as genuine signals. This difficulty may be obviated if the signals to be transmitted are first converted to alternating binary form. In this form of signal the first binary value is represented by a reference D.C. level while the second binary value is represented by one or other of two other D.C. levels which are of opposite polarity respectively with respect to the reference level. Irrespective of where elements of the second binary value appear in a train of information, each element of the second binary value will be of opposite polarity with respect to the preceding element of this value.

It may be convenient to arrange that binary information is contained in a signal, before conversion to alternating binary form, on the basis that any excursion between the two binary current levels, irrespective of the direction of the excursion, represents one binary value while successive elements of the other binary value are represented by the current remaining at one of the two significant levels for a prolonged period. This method of working obviously requires some form of time control. Alternatively, successive elements of the signal may be separated by pauses during which the current always has one of the two nominal levels in which case elements of the other binary value appear as specific pulses or, in other words, one of the binary values is represented by discrete pulses which, in a synchronous system, do not ocupy the whole of the width of a time slot.

For the arrangement according to the invention to be applicable it is only necessary that the transition between the two current levels is reasonably sharp and that the difference in level is sufficient for the change to be detected by the circuit. The chief object of the invention is to provide a simple converter which will change signals comprising basically two levels of direct current into signals where successive pulses have alternate polarity about a reference level.

The invention accordingly comprises an arrangement whereby a waveform carrying binary information on the basis that an excursion from one to the other of two current levels represents one binary value and a continuation at either of the current levels represents the other binary value is converted into a waveform comprising pulses of predetermined length and of alternate polarity corresponding time to the said excursions in which the input waveform is fed to two transistors of complementary type, the outputs from the two transistors being connected together and to a capacitor provided with a load circuit from one terminal of which the required output is obtained.

It will be appreciated that since the output is taken through a capacitor, no question of D.C. unbalance will arise.

Figure 2:
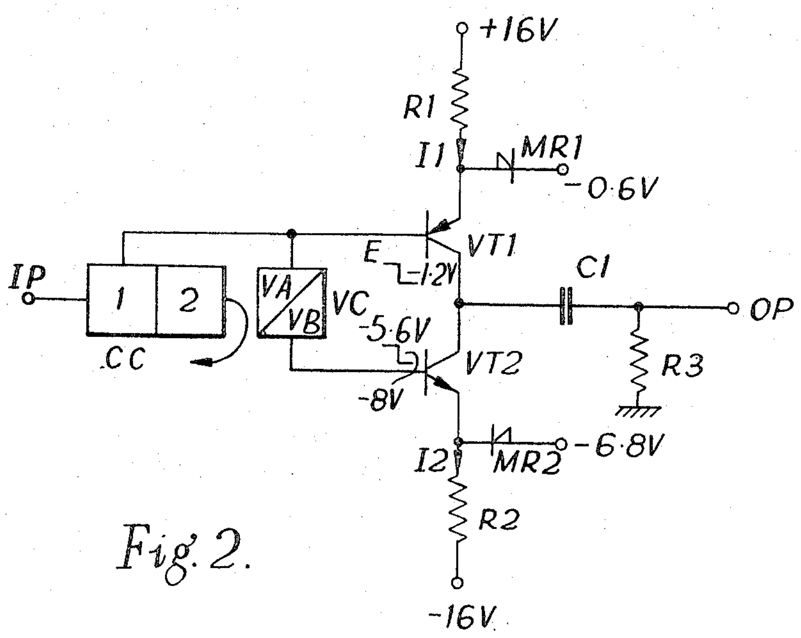
Figure 3:
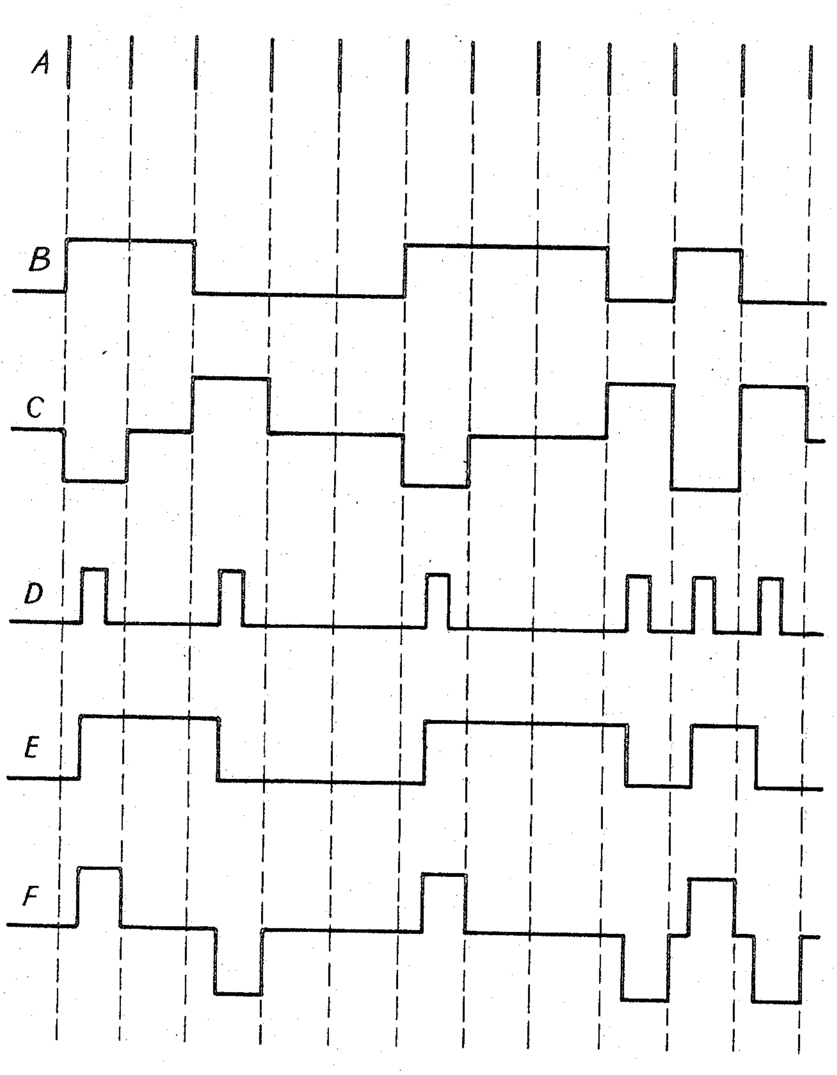

The invention will be better understood from the following description of two methods of carrying it into effect, which should be taken in conjunction with the accompanying drawings comprising FIGURES 1 to 3.

FIGURE 1 shows the more general case in which the input which varies between two particular binary values is applied to the bases of the two transistors, the circuit of one of them however including a voltage translator in order to obtain suitable voltage values.

FIGURE 2 shows a more specific case in which the input is in the form of discrete pulses representing for instance 1's, and use is therefore made of a two-stage counter which has the effect of converting the discrete pulse input into an input similar to that assumed in the case of FIGURE 1. FIGURE 2 moreover indicates typical voltage values and shows the constant current generators in the form of high value resistors which give a sufficient approximation.

FIGURE 3 comprises a series of waveform diagrams which assist in the understanding of the invention.

Considering first FIGURE 3, the uppermost line A represents the timing intervals in a synchronous system which define the full length of the time slot. The second line B represents the waveform of the input signal in the case of FIGURE 1. The third waveform C represents the output which is obtained from the circuit arrangement according to the invention. It will be noted that waveforms B and C have been shown as involving idealised square waves, though in practice the leading and trailing edges would be somewhat sloping and the corners would tend to be rounded. Moreover there would probably be small variations in the portions where the current is shown as steady. It should also be mentioned that in waveform C the alternate positive and negative pulses have been shown as of full element length. This length may however be varied according to requirements by altering the values of the capacitor and associated current generators and clamping potentials.

The curves D, E and F show the various signals which apply in the case of FIGURE 2, D being the input from IP to the counter, E the input to the transistors and F the output from OP. In this case the input signals which are of the same value as before involve discrete pulses for one of the binary values while the alternate positive and negative output pulses are assumed to be of less than full element length.

Considering now the arrangement of FIGURE 1, it is assumed that the binary input is applied to the input terminal IP which is connected to the base of the transistor VT1 which is of the pnp type and also by way of the voltage translator VC to the base of the transistor VT2 which is of the npn type. The transistor VT1 has its emitter connected to a positive constant current generator I1 and the emitter is also clamped to a suitable potential by way of the rectifier MR1. Similarly the transistor VT2 has its emitter connected to a negative constant current generator I2 and it is also clamped to a suitable potential by way of the rectifier MR2. The collectors of the two transistors are connected together and to the capacitor C1 in the output circuit extending to the terminal OP. This terminal is also connected to earth by way of the resistor R which forms a load which is traversed by the capacitor charging current.

Assuming that the input applied to IP is moving towards its more positive value, that is to say is positive-going, at a particular value transistor VT1 will be cut off but transistor VT2 will be conducting. Capacitor C1 is accordingly charged and this continues until VT2 saturates and conditions are then maintained by the current flow through MR2. When the input changes to the more negative binary value, transistor VT2 is cut off and transistor VT1 conducts. Capacitor C1 is then discharged through resistor R and produces the appropriate pulse over the output terminal OP. Capacitor C1 is now charged in the opposite direction by current flow from source I1 over VT1 and when this transistor saturates, conditions are maintained by current flow through recitifier MR1. A pulse of the same amplitude and length but of opposite polarity is then transmitted over OP when the incoming signal again changes its value. Thus single output pulses are obtained which are of opposite polarity depending on the direction of change of the incoming binary values.

It will be appreciated that the voltage translator serves to provide a suitable bias for transistor VT2 so that transistor VT1 shall be cut off when transistor VT2 conducts and vice versa. It may conveniently comprise a transformer having the incoming signal connected across the primary, one terminal of which is connected to the base of transistor VT1 and the other to a suitable first reference potential. One terminal of the secondary would then be connected to the base of transistor VT2 and the other to a suitable second reference potential which would be different from the first reference potential.

The arrangement of FIGURE 2 produces output pulses only when the input changes of D.C. level are in a particular direction and these output pulses are alternately positive and negative. Use is made in this case of a cyclic counter CC which, since it involves only two stages, may be a toggle circuit or flip-flop of known type. The remainder of the circuit is similar to that in FIGURE 1 except that as already pointed out, constant current generator I1 is in the form of a high value resistor R1 and constant current generator I2 is in the form of a high value resistor R2. The output of stage 1 of the counter which is similar to the input to the terminal IP in FIGURE 1 is connected to the bases of the two transistors, in the case of transistor VT2 by way of the voltage translator VC.

The counter performs a divide-by-two function and if the arrangement is being used in which discrete pulses are employed, as in waveform D, the output from the counter will be as waveform E.

When the counter is in the stage 1 position in which, for instance, the output has its more negative value, transistor VT1 will be conducting and transistor VT2 will be cut off. Consequently charging of capacitor C1 takes place by way of resistor R1 and when VT1 saturates, current again flows through rectifier MR1. When the counter is advanced to stage 2, the output from stage 1 goes positive, and transistor VT1 is cut off and transistor VT2 now conducts, with the result that a pulse of predetermined duration and amplitude is transmitted over terminal OP and capacitor C1 now commences to charge in the opposite direction. The effect of the arrangement according to FIGURE 2 is therefore that the incoming pulses, which are all of the same polarity, are converted so that the outgoing pulses which correspond thereto are of alternate polarity. This is shown in waveform F of FIGURE 3 in which as mentioned above it is assumed that the output pulse extends only to the end of the time slot or element concerned.

We claim:

1. Equipment for converting a signalling waveform involving changes from one to the other of two current levels into discrete pulses of alternate polarity corresponding to such changes, comprising in combination a first transistor of one conductivity type, a second transistor of opposite conductivity type, each of said transistors having base, emitter and collector electrodes, a first constant current source connected to the emitter of said first transistor, a second constant current source connected to the emitter of said second transistor, an output terminal, a capacitor having one plate connected to the collectors of both said transistors and the other plate to said output terminal, means for supplying said signalling waveform to the base of said first transistor, a voltage translator having an input and an output, means for supplying said signalling waveform to the input of said voltage translator, a connection from the output of said voltage translator to the base of said second transistor and a load circuit connected to said output terminal.

2. Equipment as claimed in claim 1 in which the emitter of said first transistor is clamped to a fixed potential by way of a first diode and the emitter of said second transistor is clamped to a different fixed potential by way of a second diode.

3. Equipment for converting incoming signals comprising discrete pulses of the same polarity into corresponding pulses of alternate polarity comprising in combination, a two-stage cyclic counter having an input and an output, means for applying said incoming signals to the input to said counter, a first transistor of one conductivity type, a second transistor of opposite conductivity type, means for applying the output from said counter to each of said transistors, a capacitor, means for supplying the outputs from both said transistors to one plate of said capacitor, an output terminal connected to the other plate of said capacitor, a load circuit connected to said output terminal, and biasing means for said transistors whereby only one of said trainsistors conducts at a time and the effect of the beginning and of the end of an incoming pulse is to change over the transistor which is conducting, such change causing the state of charge of said capacitor to change from one polarity to another.

4. Equipment for converting incoming signals comprising discrete pulses of the same polarity into corresponding pulses of alternate polarity comprising in combination, a two-stage cyclic counter having an input and an output, means for applying said incoming signals to the input to said counter, a first transistor of one conductivity type, a second transistor of opposite conductivity type, each of said transistors having base, emitter and collector electrodes, means for applying the output from said counter to the base of said first transistor, a voltage translator having an input and an output, means for applying the output from said counter to the input to said voltage translator, means for applying the output from said voltage translator to the base of said second transistor, a source of positive potential, a first resistor of high value, a connection from said positive source to the emitter of said first transistor by way of said first resistor, a source of negative potential, a second resistor of high value, a connection from said negative source to the emitter of said second transistor by way of said second resistor, an output terminal, a capacitor having one plate connected to the collectors of both said transistors and the other plate to said output terminal and a load resistance connected between said output terminal and a source of potential intermediate the values of said positive and negative sources.

References Cited

UNITED STATES PATENTS

| | | | |
|---|---|---|---|
| 3,154,777 | 10/1964 | Thomas | 340—347 |
| 3,200,263 | 8/1965 | Zenzefilis | 340—347 |
| 3,217,316 | 11/1965 | Trampel | 340—347 |

MAYNARD R. WILBUR, *Primary Examiner.*

K. R. STEVENS, W. J. KOPACZ, *Assistant Examiners.*